United States Patent
Cole et al.

[15] 3,667,486
[45] June 6, 1972

[54] AUTOMATIC WHEEL CLEANING APPARATUS

[72] Inventors: Joseph J. Cole; Charles A. Bookwalter, II, both of c/o Nora Plaza Car Wash, 1300 E. 86th Street, Indianapolis, Ind. 46240

[22] Filed: Feb. 19, 1971

[21] Appl. No.: 116,809

[52] U.S. Cl. ............................................134/45, 15/DIG. 2
[51] Int. Cl. .......................................B60s 3/04, B08b 3/04
[58] Field of Search ................134/45, 123; 15/DIG. 2, 21 R, 15/97; 239/569

[56] References Cited

UNITED STATES PATENTS

| | | | |
|---|---|---|---|
| 2,716,772 | 9/1955 | Cockrell | 134/45 X |
| 2,822,564 | 2/1958 | Crivelli | 134/45 X |
| 3,578,001 | 5/1971 | Attaway | 134/45 |
| 3,602,236 | 8/1971 | Larkin, Jr. | 134/45 |
| 3,604,433 | 9/1971 | Notthoff | 134/45 X |

*Primary Examiner*—Edward L. Roberts
*Attorney*—Verne A. Trask, Thomas P. Jenkins and Jack W. Hanley

[57] ABSTRACT

Wheel cleaning apparatus for automatic vehicle washing installations in which steam is applied to a wheel while the wheel is in contact with a projecting wand. Contact between the wand and a passing wheel closes an electrical circuit and actuates a solenoid which opens a valve to permit steam to pass from a source to and through the steam outlet. When the wheel passes beyond the wand the electrical circuit is broken and the steam control valve closes.

7 Claims, 3 Drawing Figures

INVENTORS
JOSEPH J. COLE
CHARLES A. BOOKWALTER II
BY
ATTORNEYS

3,667,486

AUTOMATIC WHEEL CLEANING APPARATUS

BACKGROUND OF THE INVENTION

This invention relates to wheel cleaning apparatus for vehicle washing installations, and more particularly to apparatus to automatically steam-clean the vehicle wheels while the vehicle is traveling along a path through the washing installation.

Automatic car washing installations are widely used. They vary in the extent of automation and in the manner in which the various functions are accomplished. The vehicle to be washed is frequently moved through a washing installation in a predetermined path by a chain, or by a conveyor. Washing apparatus such as spray nozzles, brushes and blowers are positioned along the sides and above the vehicle path. By various mechanical or electrical means, the washing and drying devices are made to operate when a vehicle is in the vicinity. One of the prime objectives of an automatic car wash is to reduce the necessity of human labor and its significant cost factor. Nevertheless, most installations still require considerable manual labor, both in performing those tasks which the machines cannot readily perform and for final touch-up purposes.

The wheels of vehicles, such as passenger cars, present some difficult cleaning problems. The tires, often with white-walls, together with the hub caps frequently present uneven and intricate surfaces. And it is well known to automobile owners that hub caps and white-wall tires have an extreme affinity for dirt and grime. Rapid and adequate cleaning of the wheels presents a significant problem in designing and operating automatic washing installations. Steam cleaning of the wheels is almost universally used.

Some installations utilize the automatic application of steam for a timed interval while the automobile wheel is caused to rotate rapidly. A trip wire is used to turn on the steam for a pre-set time. While such devices can be effective, they are ill-suited to handling a succession of vehicles with different sizes of wheels. Such vehicles are certainly common and would be expected in a commercial car washing installation. With a large wheel, the timed-cycle would likely be inadequate for the task, and with a smaller wheel, would be wasteful of steam. Moreover, variations in the speed of travel of the vehicle can have deleterious effects on the wheel washing operation.

The disadvantages of the known automatic wheel cleaning devices have contributed to the continued use of manual steam hoses to do the job. This, of course, necessitates a man on each side of the vehicle with all the disadvantages of using human labor for this job. Although it may sometimes be desirable to utilize a steam hose to clean the bumpers and lower portions of the front and rear of the vehicles, these functions could be performed by one man, provided he did not have the additional responsibility for cleaning the wheels on both sides of the vehicle.

SUMMARY OF THE INVENTION

The present invention provides an efficient automatic wheel cleaning apparatus. Steam is automatically sprayed onto a wheel only while the wheel is passing by the steam outlet. This is true regardless of the speed of travel of the vehicle through the installation and regardless of the size of the wheel. A steam outlet is positioned adjacent the vehicle path and so as to be in close proximity to a passing vehicle wheel. A valve between a steam source and the steam outlet is normally closed. The valve is operably connected with a solenoid and the solenoid is actuated and the valve opened during such time as a passing vehicle wheel is in contact with a wand which extends into the vehicle path. Steam will pass through the outlet only during such time as the vehicle wheel is in position to provide a certain target. The disadvantages of the timed steam cycle are eliminated.

DETAILED DESCRIPTION OF AN EMBODIMENT OF THE INVENTION

Figure 1:
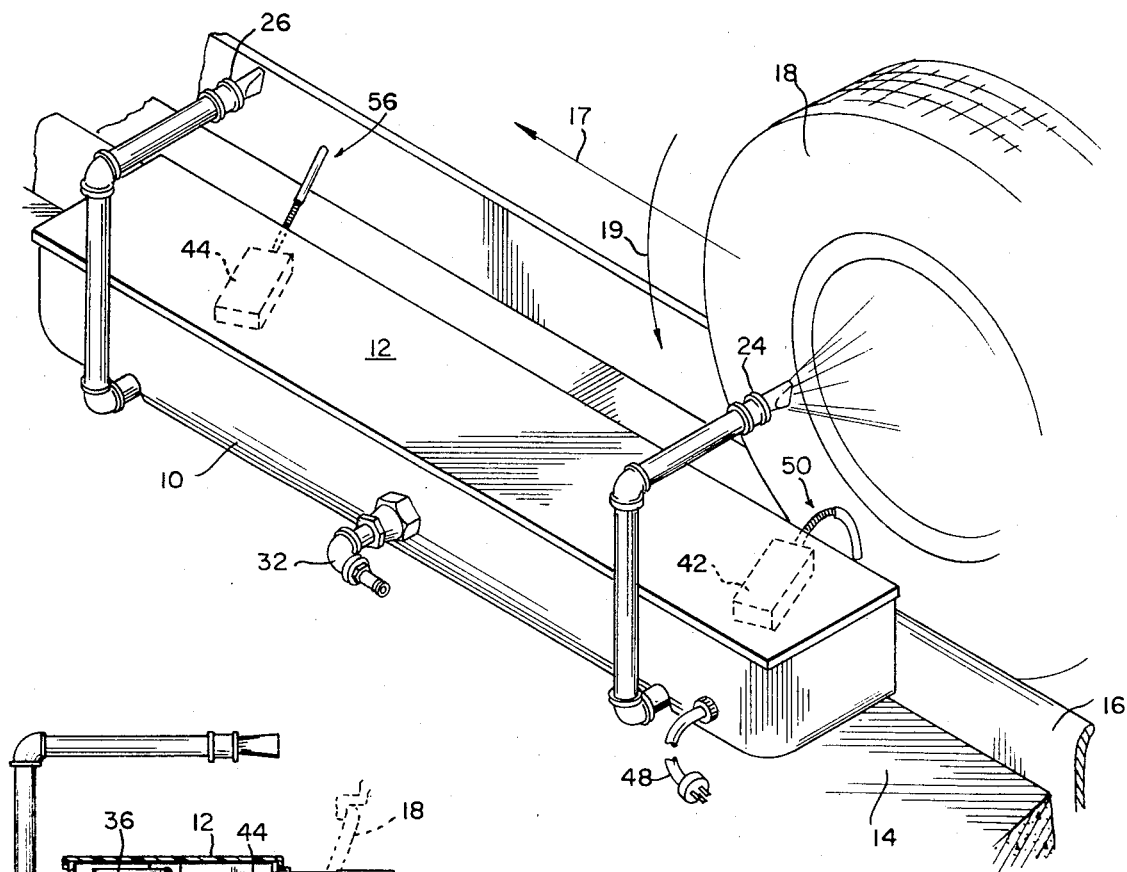
FIG. 1 is a perspective view of the wheel cleaning apparatus in position adjacent the path of a vehicle.

As illustrated in FIG. 1, the apparatus includes a housing 10 having a lid or cover 12 which together form a relatively water tight compartment. The housing 10 may rest on the floor 14 of an automatic vehicle washing installation. Housing 10 is immediately adjacent a guide rail 16.

Figure 3:
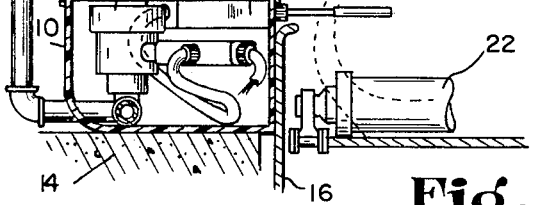
FIG. 3 is a sectional view taken along the line 3—3 of FIG. 2.
Figure 2:
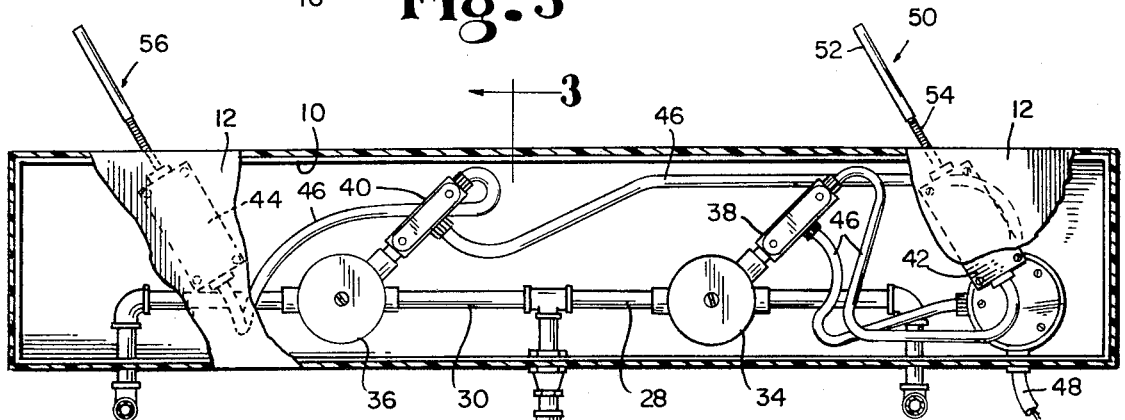
FIG. 2 is a plan view of the apparatus shown in FIG. 1, but with the cover removed therefrom.

A vehicle to be washed passes through the installation in a path from right to left in FIG. 1, as indicated by the directional arrow 17. The moving vehicle wheels, as illustrated by wheel 18, on the side adjacent the wheel cleaning apparatus, rotate in a counter-clockwise direction in FIG. 1, as illustrated by the directional arrow 19. The vehicle may be transported through the installation as by being pulled over rollers 22 (FIG. 3).

A steam outlet 24 extends from housing 10 to a position adjacent the vehicle path and so as to be in close proximity to a vehicle wheel as it passes. A second steam outlet 26 is similarly situated with respect to the vehicle path and a passing wheel. Steam outlet 26 also extends from housing 10 and at an appropriate longitudinally spaced distance from steam outlet 24.

Outlets 24 and 26 are connected by piping 28 and 30 respectively to a common steam inlet pipe 32 which extends outwardly from housing 10 and is connected to an appropriate source of steam, not shown. Valves 34 and 36 are provided between the inlet pipe 32 and outlets 24 and 26. Valves 34 and 36 are normally in a closed position, thus preventing steam from the steam source from passing to and through either of the steam outlets. Valve 34 is opened during such time as its associated solenoid 38 is actuated. Likewise, valve 36 is opened during such time as its associated solenoid 40 is actuated. Actuation of solenoids 38 and 40 is controlled by electrical switches 42 and 44, respectively. The electrical leads between the switches and solenoids are preferably contained in waterproof conduits 46. An electrical lead 48 passes through housing 10 for connection to a power source, not shown.

A wand 50, having a rod portion 52 and a coil spring portion 54, extends from housing 10 into the vehicle path in the direction of and at an oblique angle to the path of travel of the vehicle. Wand 50 is relatively close to the floor of the installation and parallel therewith so that it will be contacted by a passing vehicle wheel 18. Each of the wheels on the same side of the vehicle will, in sequence, come into contact with wand 50. Wand 50 is located close to steam outlet 24 and by reason of its angular disposition into the vehicle path, the wheel 18 contacts the wand at the same time that the forward portion of the wheel is in position to receive spray from outlet 24 to achieve the maximum cleaning action from said outlet. Wand member 54 is identical to wand 50 and is similarly positioned with respect to steam outlet 26. The construction of wand members 50 and 56, with rod portions and coil spring portions, permit substantially universal movement of the wand upon contact with a wheel and assures that the wand will be in contact with a wheel so long as the wheel is in the operative vicinity of the adjacent steam outlet.

When a vehicle wheel, such as wheel 18, contacts wand 50, the coil spring portion 54 will move to close switch 42. Thus, the electrical circuit including the associated solenoid 38 and the power source will be completed, causing solenoid 38 to be actuated and valve 34 to be opened. Steam will be ejected from outlet 24 so long as valve 34 is open. When wheel 18 passes beyond wand 50, switch 42 will be opened again and valve 34 will be closed.

When wheel 18 contacts wand 56, wand 56 operates switch 44 in the same manner to cause valve 36 to be opened, thus allowing steam to be ejected through outlet 26. When wheel 18 is no longer in contact with wand 56, switch 44 is opened and valve 36 closes.

We claim:

1. Wheel cleaning apparatus for vehicle washing installations in which a vehicle travels along a path through the installation, comprising a steam outlet positioned adjacent the vehicle path and so as to be in close proximity to a passing vehicle wheel, means adapted to connect said steam outlet to a steam source, and control means to control the flow of steam from said source to and through said outlet, said control means including a solenoid, a valve operably connected with said solenoid, and a wand extending into said vehicle path for sequential contact with the wheels on the same side of the vehicle, said solenoid being actuated to open said valve and permit steam to pass from said source to and through said outlet during such time as said wand is in contact with a vehicle wheel.

2. The invention set forth in claim 1 wherein said wand extends into said vehicle path in the direction of and at an oblique angle to said vehicle path.

3. The invention set forth in claim 1 wherein said wand comprises a rod portion and a coil spring portion capable of substantially universal movement, whereby a vehicle wheel contacting said wand causes an electrical circuit to be completed to actuate said solenoid.

4. The invention set forth in claim 1 with the addition of a second steam outlet positioned adjacent the vehicle path and so as to be in close proximity to a passing vehicle wheel, said second steam outlet being in spaced relation from the first steam outlet, means adapted to connect said second steam outlet to said steam source, and second control means to control the flow of steam from said source to and through said second outlet, said second control means including a second solenoid, a second valve operably connected with said second solenoid, and a second wand extending into said vehicle path for sequential contact with the wheels on the same side of the vehicle, said second solenoid being actuated to open said second valve and permit steam to pass from said source to and through said second outlet during such time as said second wand is in contact with a vehicle wheel.

5. The invention set forth in claim 4 wherein said second wand extends into said vehicle path in the direction of and at an oblique angle to said vehicle path.

6. The invention set forth in claim 4 wherein said first and second wands each comprise a rod portion and a coil spring portion capable of substantially universal movement, whereby a vehicle wheel contacting with one of said wands causes an electrical circuit to be completed to actuate the solenoid associated with that wand.

7. The invention set forth in claim 4 wherein said first and second steam outlets and wands extend outwardly from a single housing and said first and second solenoids and valves are contained within said housing.

* * * * *